US012207030B2

(12) United States Patent
Kawahara et al.

(10) Patent No.: US 12,207,030 B2
(45) Date of Patent: Jan. 21, 2025

(54) OPTICAL NODE DEVICE, OPTICAL TRANSPORT NETWORK SYSTEM, OPTICAL PATH TRACE METHOD AND PROGRAM

(71) Applicant: Nippon Telegraph and Telephone Corporation, Tokyo (JP)

(72) Inventors: Hiroki Kawahara, Musashino (JP); Takeshi Seki, Musashino (JP); Sachio Suda, Musashino (JP); Kohei Saito, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 137 days.

(21) Appl. No.: 18/014,292

(22) PCT Filed: Jul. 6, 2020

(86) PCT No.: PCT/JP2020/026499
§ 371 (c)(1),
(2) Date: Jan. 3, 2023

(87) PCT Pub. No.: WO2022/009293
PCT Pub. Date: Jan. 13, 2022

(65) Prior Publication Data
US 2023/0254611 A1  Aug. 10, 2023

(51) Int. Cl.
*H04Q 11/00* (2006.01)
*H04B 10/40* (2013.01)
(Continued)

(52) U.S. Cl.
CPC ..... *H04Q 11/0005* (2013.01); *H04Q 11/0062* (2013.01); *H04B 10/40* (2013.01);
(Continued)

(58) Field of Classification Search
None
See application file for complete search history.

(56) References Cited

U.S. PATENT DOCUMENTS

| 6,134,036 A * | 10/2000 | Andreozzi | H04Q 11/0062 |
| | | | 398/1 |
| 2011/0008041 A1* | 1/2011 | Uchiyama | H04J 14/022 |
| | | | 398/30 |

(Continued)

FOREIGN PATENT DOCUMENTS

| JP | 2011019165 | 1/2011 |
| JP | 2015095808 | 5/2015 |

OTHER PUBLICATIONS

Ikuma et al., "Low-Loss Transponder Aggregator Using Spatial and Planar Optical Circuit," Journal of Lightwave Technology, 2016, 34(1):67-72.

(Continued)

*Primary Examiner* — Darren E Wolf
(74) *Attorney, Agent, or Firm* — Fish & Richardson P.C.

(57) ABSTRACT

An optical node device includes a transmission transponder, WSSs, a beam splitter, and a monitoring transponder. The transmission transponder transmits an optical signal via an optical path set in an optical fiber. The WSSs ultiplex, on the transmitted optical signal, a monitoring control signal for performing optical path tracing that is confirmation of conduction along the optical path. The monitoring transponder measures and monitors the optical power of the monitoring control signal multiplexed into the optical signal branched by the beam splitter, and further monitors whether the monitored optical power is equal to or higher than a predetermined level indicating normality of the optical path.

10 Claims, 7 Drawing Sheets

(51) Int. Cl.
*H04B 10/50* (2013.01)
*H04B 10/60* (2013.01)

(52) U.S. Cl.
CPC .............. *H04B 10/50* (2013.01); *H04B 10/60* (2013.01); *H04Q 2011/0016* (2013.01); *H04Q 2011/0083* (2013.01)

(56) References Cited

U.S. PATENT DOCUMENTS

| | | | | |
|---|---|---|---|---|
| 2013/0294770 A1* | 11/2013 | Hino | ................... | H04J 14/0212 398/34 |
| 2015/0132009 A1* | 5/2015 | Yuki | ................... | H04J 14/0212 398/201 |
| 2017/0250752 A1* | 8/2017 | Yuki | ................... | H04Q 11/0062 |

OTHER PUBLICATIONS

Telecommunications Standardization Sector of ITU, "Series Y: Global Information Infrastructure, Internet Protocol Aspects and Next-Generation Networks, Internet of Things and Smart Cities, Internet protocol aspects—Transport, Interfaces for the optical transport network," ITU-T G.709/Y.1331, Series G:Transmission Systems and Media, Digital Systems and Networks, Digital terminal equipments—General, Jun. 2016, retrieved from URL <http://www.itu.int/rec/dologin_pub.asp?lang=e&id=T-REC-G.709-201606-I!!PDF-E&type=items>, 244 pages.

* cited by examiner

OPTICAL NODE DEVICE, OPTICAL TRANSPORT NETWORK SYSTEM, OPTICAL PATH TRACE METHOD AND PROGRAM

CROSS-REFERENCE TO RELATED APPLICATIONS

This application is a National Stage application under 35 U.S.C. § 371 of International Application No. PCT/JP2020/026499, having an International Filing Date of Jul. 6, 2020.

The disclosure of the prior application is considered part of the disclosure of this application, and is incorporated by reference in its entirety into this application.

TECHNICAL FIELD

The present invention relates to an optical node device, an optical transport network system, an optical path tracing method, and a program for performing optical path tracing that is confirmation of conduction along an optical path relaying an optical node device in an optical transport network system configured by connecting a plurality of optical node devices with optical fibers.

BACKGROUND ART

Currently, optical path tracing using a maintenance overhead (OH) of an optical transport network (OTN) system is specified in ITU-T Recommendations G.709 (OTN interface) described in Non Patent Literature 1. In addition, it is specified that a relay node of the optical node device determines whether the optical signal has reached its destination depending on whether the optical power is at a predetermined level.

Figure 7:
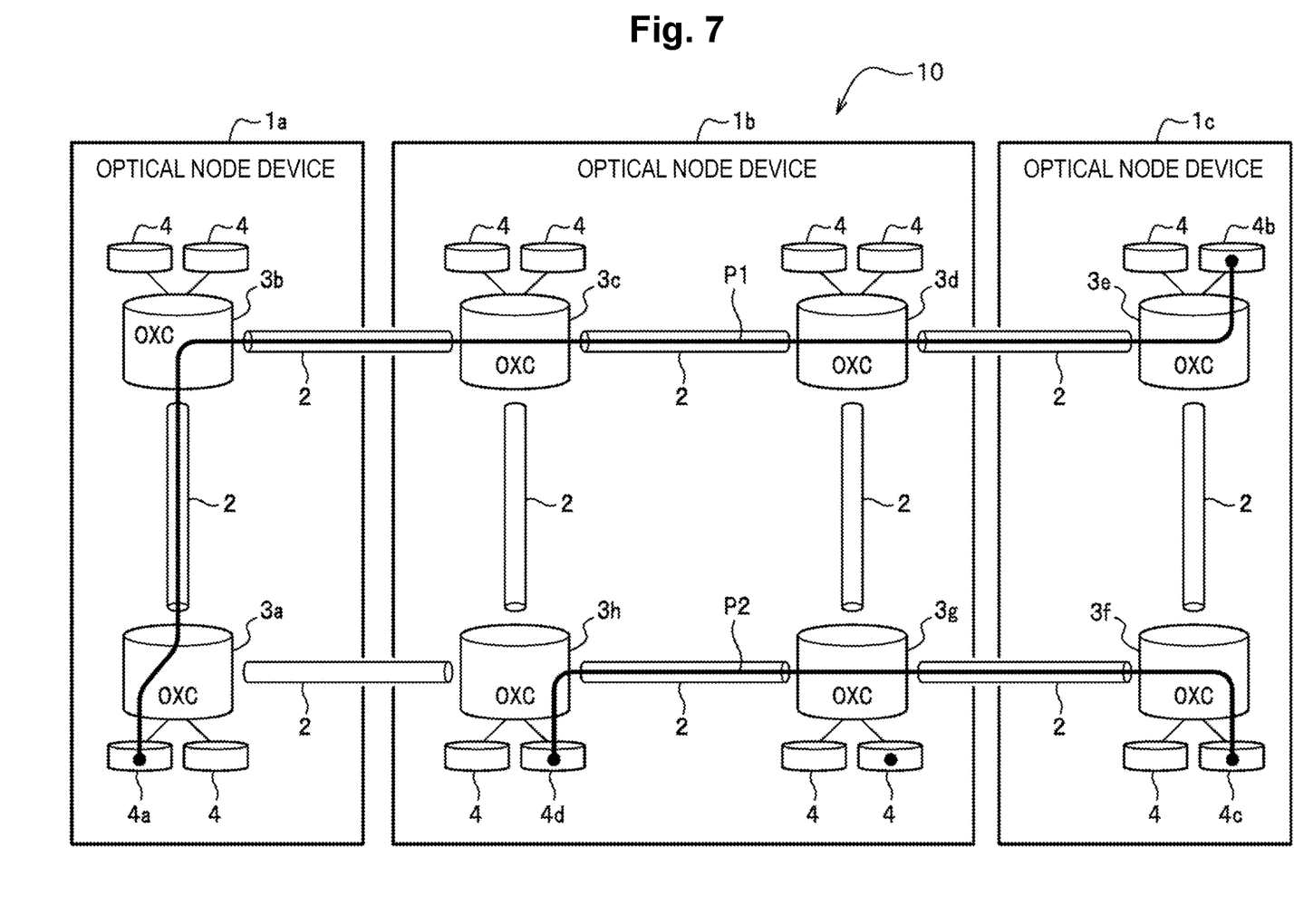
FIG. 7 is a block diagram illustrating a configuration of a conventional OTN system.

FIG. 7 is a block diagram illustrating a configuration of a conventional OTN system. An OTN system 10 illustrated in FIG. 7 includes a plurality of optical node devices 1a, 1b, and 1c, and each of the optical node devices 1a to 1c is connected with an optical fiber 2. Each of the optical node devices 1a to 1c has a different unique network (NW) domain. In addition, each of the optical node devices 1a to 1c includes a plurality of Optical Cross Connects (OXCs) 3a to 3h and a plurality of transponders 4. The plurality of transponders 4 are connected to the OXCs 3a to 3h, and the OXCs 3a to 3h are connected with the optical fiber 2.

The OXCs 3a to 3h are used for performing switching control for arbitrarily setting an optical transmission path for data transmission via the optical fiber 2. The transponder 4 relays data to and from a communication device (not illustrated).

The transponder 4a and the OXCs 3a and 3b of the optical node device 1a, the OXCs 3c and 3d of the optical node device 1b, and the OXC 3e and the transponder 4b of the optical node device 1c are connected with the optical fiber 2, and an optical path P1 is set via the optical fiber 2. That is, the transponder 4a of the optical node device 1a and the transponder 4b of the optical node device 1c are connected by the optical path P1 via the optical node device 1b, and the optical signal is transmitted through the optical path P1.

In addition, the transponder 4c and OXC3f of the optical node device 1c and the OXC3g, OXC3h, and the transponder 4d of the optical node device 1b are connected with the optical fibers 2, and the optical path P2 is set via the optical fiber 2. That is, the transponder 4c and the transponder 4d are connected by the optical path P2, and the optical signal is transmitted through the optical path P2.

In such an OTN system 10, NW administrators are different for each NW domain of the optical node devices 1a to 1c. Each NW administrator monitors whether the optical paths P1 and P2 are extended over the optical node devices 1a to 1c normally based on the transparent (transmission) mode.

CITATION LIST

Non Patent Literature

Non Patent Literature 1: ITU-T G.709/Y.1331, "Interfaces for the optical transport network" (2020.06.16)

SUMMARY OF INVENTION

Technical Problem

In the OTN system 10 described above, since the mode is the transparent mode, the monitor functions in the optical node devices 1a to 1c are limited by the optical power level. For this reason, the following problem occurs in failure analysis in a case where setting of the optical path (for example, the optical path P1) fails. That is, in a case where an optical signal different from the original optical signal arrives due to an abnormality of the switch or the like even though the optical path P1 is not set normally, since the optical signal is monitored at the optical power level, the optical signal cannot be distinguished from the original optical signal. That is, in a case where the erroneous optical signal is equal to or higher than a predetermined level, it is determined as normal, and thus there is a problem that the optical signal cannot be determined as abnormal.

In addition, it is assumed that the optical path is set across the optical node devices 1a to 1c of a plurality of NW domains managed by different NW operators. As described above, in a case where the optical path P1 is set across the optical node device 1b between the optical node device 1a and the optical node device 1c, since the relay optical node device 1b does not include an end point of the optical path P1, there is a problem that the NW operator in the NW domain cannot perform the optical path tracing.

The present invention has been made in view of such circumstances, and an object of the present invention is to appropriately determine an abnormality of an optical path set between optical node devices and appropriately perform optical path tracing even in the optical node device that relays the optical path between the optical node devices.

Solution to Problem

In order to solve the above problem, an optical node device of the present invention includes a transmission transponder that transmits an optical signal via an optical path extended over an optical fiber, a wavelength selective switch (WSS) that multiplexes, on the transmitted optical signal, a monitoring control signal for performing optical path tracing that is confirmation of conduction along the optical path, a branching unit that branches the optical signal in which the monitoring control signal is multiplexed, and a monitoring transponder that measures and monitors optical power of the monitoring control signal multiplexed into the optical signal branched by the branching unit, in which the monitoring transponder monitors whether the monitored optical power is equal to or higher than a level indicating normality of the optical path.

Advantageous Effects of Invention

According to the present invention, it is possible to appropriately determine the abnormality of the optical path set between the optical node devices and to appropriately perform the optical path tracing even in the optical node device that relays the optical path between the optical node devices.

DESCRIPTION OF EMBODIMENTS

Hereinafter, embodiments of the present invention will be described with reference to the drawings. However, in all the drawings in the present specification, constituent parts having corresponding functions are denoted by the same reference numerals, and the description thereof will be appropriately omitted.

Configuration of Embodiment

Figure 1:
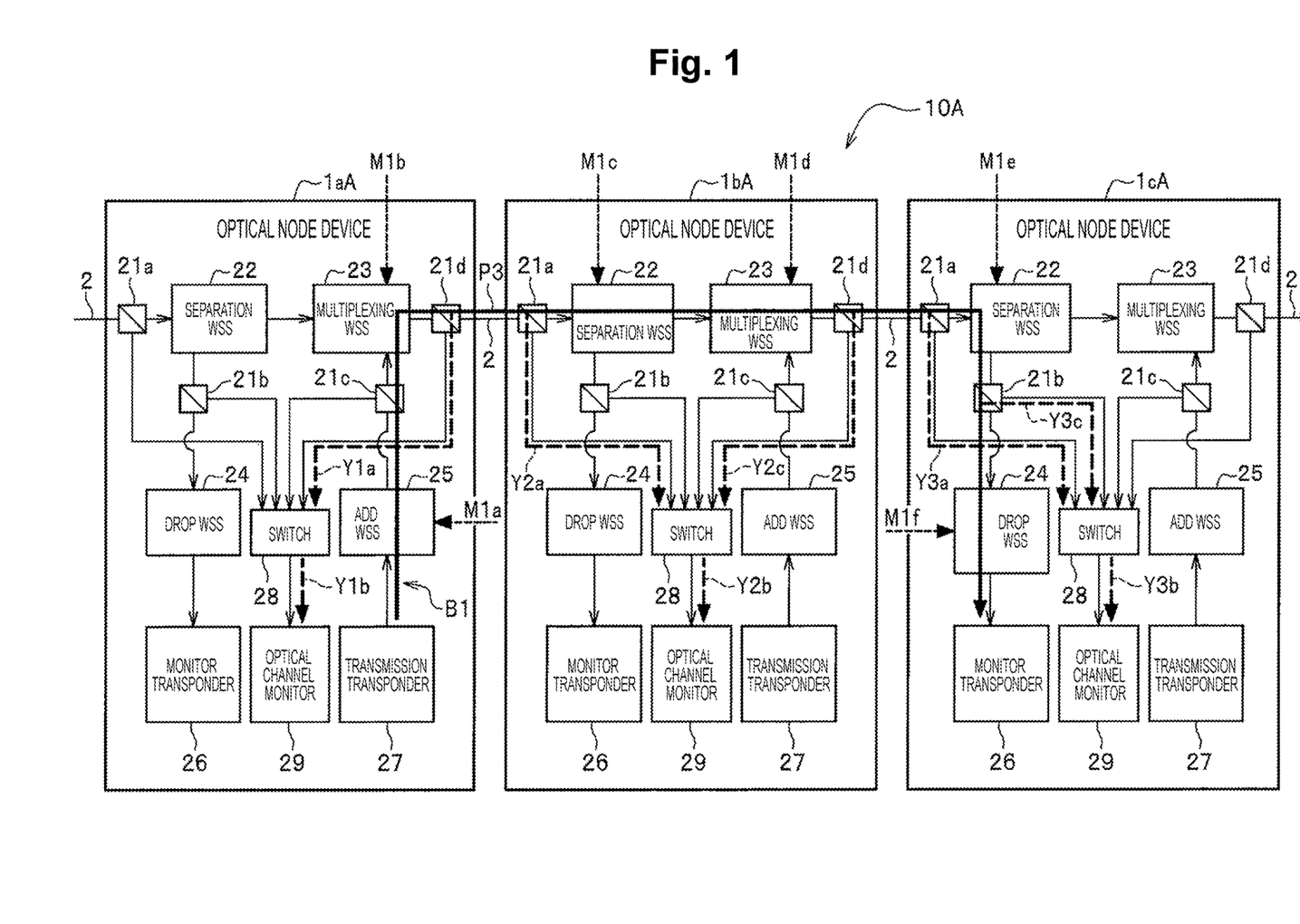
FIG. 1 is a block diagram illustrating a configuration of an OTN system using an optical node device according to an embodiment of the present invention.

FIG. 1 is a block diagram illustrating a configuration of an OTN system using an optical node device according to an embodiment of the present invention.

An OTN system 10A illustrated in FIG. 1 includes a plurality of optical node devices 1aA, 1bA, and 1cA subordinately connected with optical fibers 2. Each of the optical node devices 1aA to 1cA has the same configuration, and as shown representatively with example of the optical node device 1bA in FIG. 2, the optical node device includes beam splitters (branching units) 21a, 21b, 21c, and 21d for branching by transmission and reflection of an optical signal, a separation wavelength selective switch (WSS) 22, a multiplexing WSS 23, a drop WSS 24, an add WSS 25, a monitoring transponder 26, a transmission transponder 27, a switch 28, and an optical channel monitor 29. The separation WSS 22, the multiplexing WSS 23, the drop WSS 24, and the add WSS 25 are also referred to as WSSs 22 to 25. The beam splitters 21a, 21b, 21c, and 21d are also referred to as beam splitters 21.

Figure 2:
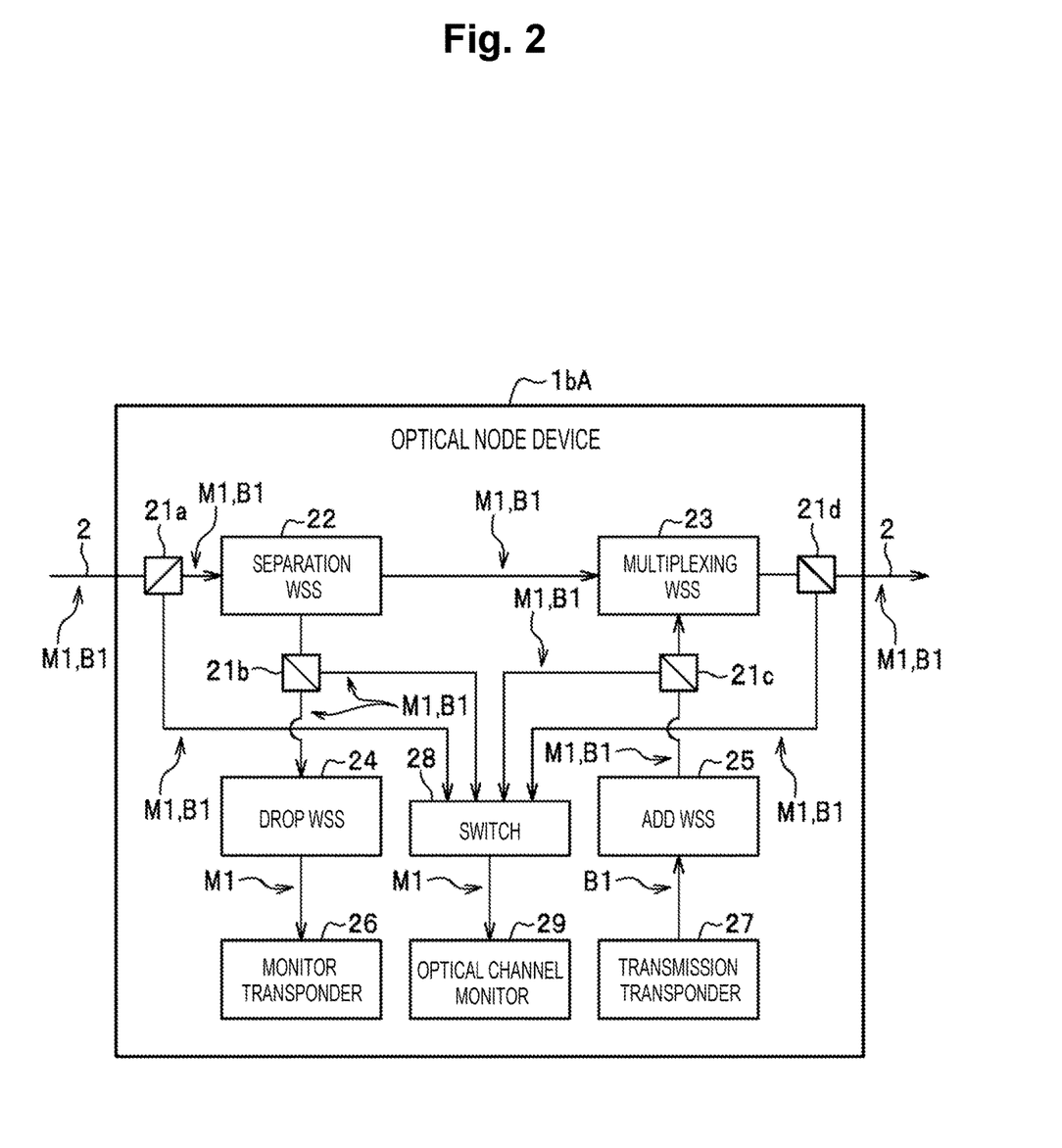
FIG. 2 is a block diagram illustrating a configuration of the optical node device.

These components 21a to 21d and 22 to 29 are connected with optical fibers as follows. That is, the beam splitter 21a is connected to the separation WSS 22 and the switch 28 with the optical fiber, and the separation WSS 22 is connected to the multiplexing WSS 23 and the beam splitter 21b. The multiplexing WSS 23 is connected to the beam splitters 21c and 21d. The beam splitter 21b is connected to the drop WSS 24 and the switch 28, and the beam splitter 21c is connected to the add WSS 25 and the switch 28.

The drop WSS 24 is connected to the monitoring transponder 26, and the add WSS 25 is connected to the transmission transponder 27. The switch 28 is connected to the optical channel monitor 29.

In such a connection configuration, as illustrated in FIG. 2, the beam splitter 21a transmits an optical signal B1 superimposed with a monitoring control signal M1 transmitted from the external optical fiber 2, outputs the optical signal B1 to the separation WSS 22, reflects the optical signal B1, and outputs the optical signal B1 to the switch 28. The monitoring control signal M1 is a signal for performing optical path tracing that is confirmation of conduction along an optical path extended and set between the end points of the optical node devices 1aA to 1cA. The monitoring control signal M1 multiplexes unique optical path identification (ID) information by intensity modulation that temporally changes the intensity of the optical signal B1.

As indicated by arrows M1a, M1b, M1c, M1d, M1e, and M1f in FIG. 1, the monitoring control signal M1 can be superimposed on the optical signal B1 in each of the WSSs 22 to 25. This superimposition can be performed by modulating the optical signal B1 with the monitoring control signal M1 including the optical path ID information unique to each of the plurality of WSSs 22 to 25.

Returning to FIG. 2, the separation WSS 22 outputs the optical signal B1 on which the monitoring control signal M1 is superimposed to the multiplexing WSS 23, separates the optical signal B1, and outputs the optical signal B1 to the beam splitter 21b. The beam splitter 21b transmits and outputs the input monitoring control signal M1 and the optical signal B1 to the drop WSS 24, and reflects and outputs the signals to the switch 28.

The drop WSS 24 branches the monitoring control signal M1 from the monitoring control signal M1 and the optical signal B1 according to the wavelength, and outputs the monitoring control signal M1 to the monitoring transponder 26. The monitoring transponder 26 measures and monitors optical power of the monitoring control signal M1. The monitor monitors whether the optical power is equal to or higher than a predetermined level indicating normality of the optical path.

The transmission transponder 27 outputs the optical signal B1 to the add WSS 25. The add WSS 25 modulates the optical signal B1 with the monitoring control signal M1 and outputs the modulated optical signal B1 to the multiplexing WSS 23 via the beam splitter 21c. The output monitoring control signal M1 and optical signal B1 are branched (reflected) by beam splitter 21c and output to the switch 28.

The multiplexing WSS 23 transmits the monitoring control signal M1 and the optical signal B1 from the separation WSS 22 to the external optical fiber 2 through the beam splitter 21d. Alternatively, the multiplexing WSS 23 multiplexes the monitoring control signal M1 and the optical signal B1 output from the add WSS 25 and transmitted through the beam splitter 21c, and transmits the multiplexed signals to the external optical fiber 2 through the beam splitter 21d. In addition, the monitoring control signal M1 and the optical signal B1 output from the add WSS 25 are reflected by the beam splitter 21c and output to the switch 28.

The switch 28 selects the monitoring control signal M1 from each of the beam splitters 21a to 21d and outputs the monitoring control signal M1 to the optical channel monitor 29. The optical channel monitor 29 reads the temporal change of the optical power of the monitoring control signal M1 and demodulates the optical path ID information. The optical channel monitor 29 detects that the optical path is extended normally as will be described later based on the optical path ID information obtained by the demodulation.

For example, the optical channel monitor 29 holds unique information of the beam splitters 21a to 21d connected to the switch 28, and it can be detected by which beam splitter 21 the switch 28 inputs the monitoring control signal M1 including the branched optical path ID information. With this function, the optical channel monitor 29 detects the WSSs 22 to 25 on which the monitoring control signals M1a to M1f (FIG. 1) including the optical path ID information are superimposed and the beam splitters 21a to 21d branching the monitoring control signals M1a to M1f immediately before the switch 28 based on the optical path ID information. By this detection, the normality of the optical path between the WSSs 22 to 25 and the beam splitters 21a to 21d can be confirmed (or detected).

Configuration Example of WSS

Figure 3:
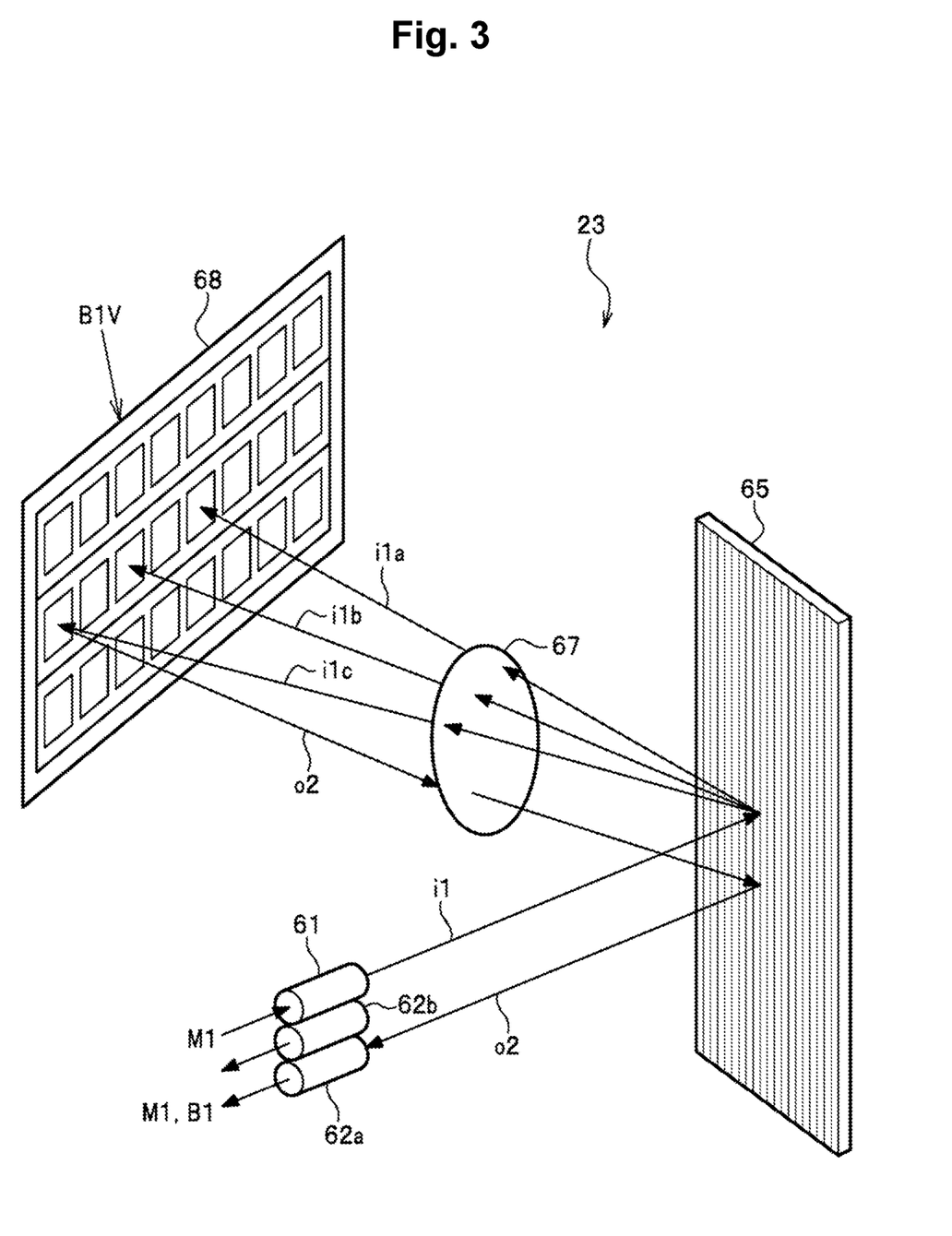
FIG. 3 is a diagram illustrating a configuration example of a WSS of the optical node device.

Here, a specific configuration example of each of the WSSs 22 to 25 having the same configuration is illustrated in FIG. 3 as a representative of the multiplexing WSS 23, and the description thereof will be made.

The multiplexing WSS 23 illustrated in FIG. 3 includes an input fiber collimator (also referred to as a collimator) 61, output collimators 62a and 62b, which are N times the number of input collimators 61 (for example, twice), a grating (diffraction grating) 65 that demultiplexes an optical signal subjected to wavelength division multiplexing, a lens 67, and a spatial light modulator 68 including, for example, liquid crystal on silicon (LCOS). The input collimator 61 and the output collimators 62a and 62b are connected to the optical fiber. Note that the input collimator 61 includes the input collimator according to the claims. The output collimators 62a and 62b include an output collimator according to the claims.

In such a configuration, the optical signal B1 from the optical fiber is incident on the grating 65 via the collimator 61 as indicated by an arrow i1. The grating 65 diffracts and reflects the optical signal B1 at different angles according to the wavelength to perform demultiplexing (for example, three-demultiplexing) as indicated by arrows i1a, i1b, and i1c. The three-demultiplexed optical signal is incident on the spatial light modulator 68 via the lens 67.

The spatial light modulator 68 reflects the three-demultiplexed optical signal. At this time, a voltage B1V (referred to as a monitoring control voltage B1V) of the monitoring control signal M1 is applied to the spatial light modulator 68 to apply intensity modulation. The optical signal B1 on which the monitoring control signal M1 is superimposed by the intensity modulation is output from the collimator 62a for desired output via the lens 67 and the grating 65 as represented by an arrow o2 as a representative of the 1 optical signal.

Figure 4:
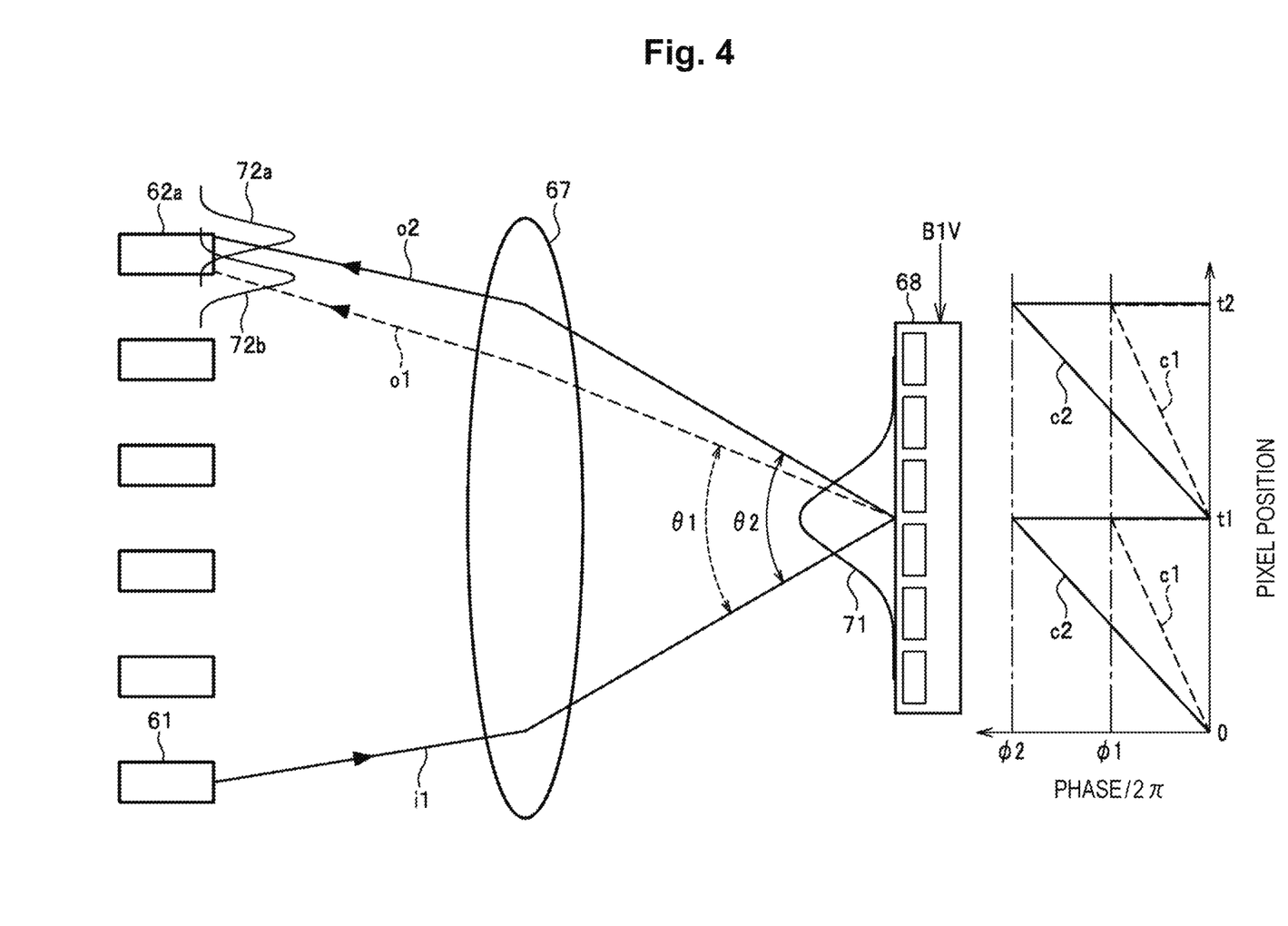
FIG. 4 is a diagram for explaining a variable operation of a reflection angle of an optical signal output to an output-side collimator by a spatial light modulator.

As indicated by the arrows i1c and o2, the optical signal is reflected by the spatial light modulator 68. As illustrated in FIG. 4, by changing the reflection angle from an angle θ2 to an angle θ1 smaller than the angle θ2, the efficiency when the optical signal is coupled to the output-side collimator 62a can be changed to be small. The attenuation amount of the optical signal B1 can be varied to be small according to the variation.

That is, when the monitoring control voltage B1V whose level changes with time is applied to the spatial light modulator 68, a phase slope 71 that changes the reflection angle changes. The phase slope 71 changes according to a phase line c2 or c1 indicated by the pixel position of the axis (first axis) along the pixels of the spatial light modulator 68 in an arrangement direction and the value of "phase/2π" of the second axis orthogonal to the first axis. According to the monitoring control voltage B1V, the phase line c2 gradually increases from 0, the value of "phase/2π" becomes the maximum value of φ2 at the pixel position t1, and rapidly decreases from φ2 to 0, and then gradually increases again to become the maximum value of φ2 at a position t2. This operation is repeated.

The input optical signal B1 indicated by the arrow i1 is reflected by the reflection angle θ2 corresponding to the phase line c2, and is output to the output-side collimator 62a as indicated by the arrow o2. The attenuation amount of the optical signal B1 in the collimator 62a is indicated by a mountain-shaped curve 72a.

On the other hand, when the level of the applied monitoring control voltage B1V becomes lower than the above level, the phase line c1 indicated by the broken line gradually increases from 0, and the value of "phase/2π" becomes the maximum value of o1 smaller than φ2 at the pixel position t1. Further, the phase line c1 rapidly decreases from φ1 to 0, and then gradually increases again to become the maximum value of φ1 at the position t2. This operation is repeated.

In the phase line c1, the reflection angle θ1 is smaller than the reflection angle θ2. The optical signal B1 indicated by the arrow o1 obtained by reflecting the input optical signal B1 of the arrow i1 at the angle θ1 is output to the output-side collimator 62a. At this time, the attenuation amount (for example, 80%) of the optical signal B1 indicated by the arrow o1 is the amount indicated by the curve 72b, and deviates to be smaller than the attenuation amount (for example, 90%) indicated by the curve 72a of the optical signal B1 indicated by the arrow o2.

Operation of Embodiment

Next, the operation of the optical path tracing in the OTN system 10A according to the present embodiment will be described with reference to the flowcharts of FIGS. 5 and 6. However, as illustrated in FIG. 1, it is assumed that an optical path P3 is extended between the transmission transponder 27 (start point) of the optical node device 1aA and the monitoring transponder 26 (end point) of the optical node device 1cA while relaying the optical node device 1bA.

Specifically, the optical path P3 extends from the transmission transponder 27 of the optical node device 1aA to the beam splitter 21a of the optical node device 1bA through the add WSS 25, the beam splitter 21c, the multiplexing WSS 23, and the beam splitter 21d via the optical fiber 2. Further, the optical path P3 reaches the beam splitter 21a of the optical node device 1cA through the separation WSS 22, the multiplexing WSS 23, and the beam splitter 21d of the optical node device 1bA via the optical fiber 2. Further, the optical path P3 reaches the monitoring transponder 26 through the separation WSS 22, the beam splitter 21b, and the drop WSS 24 of the optical node device 1cA.

Figure 5:
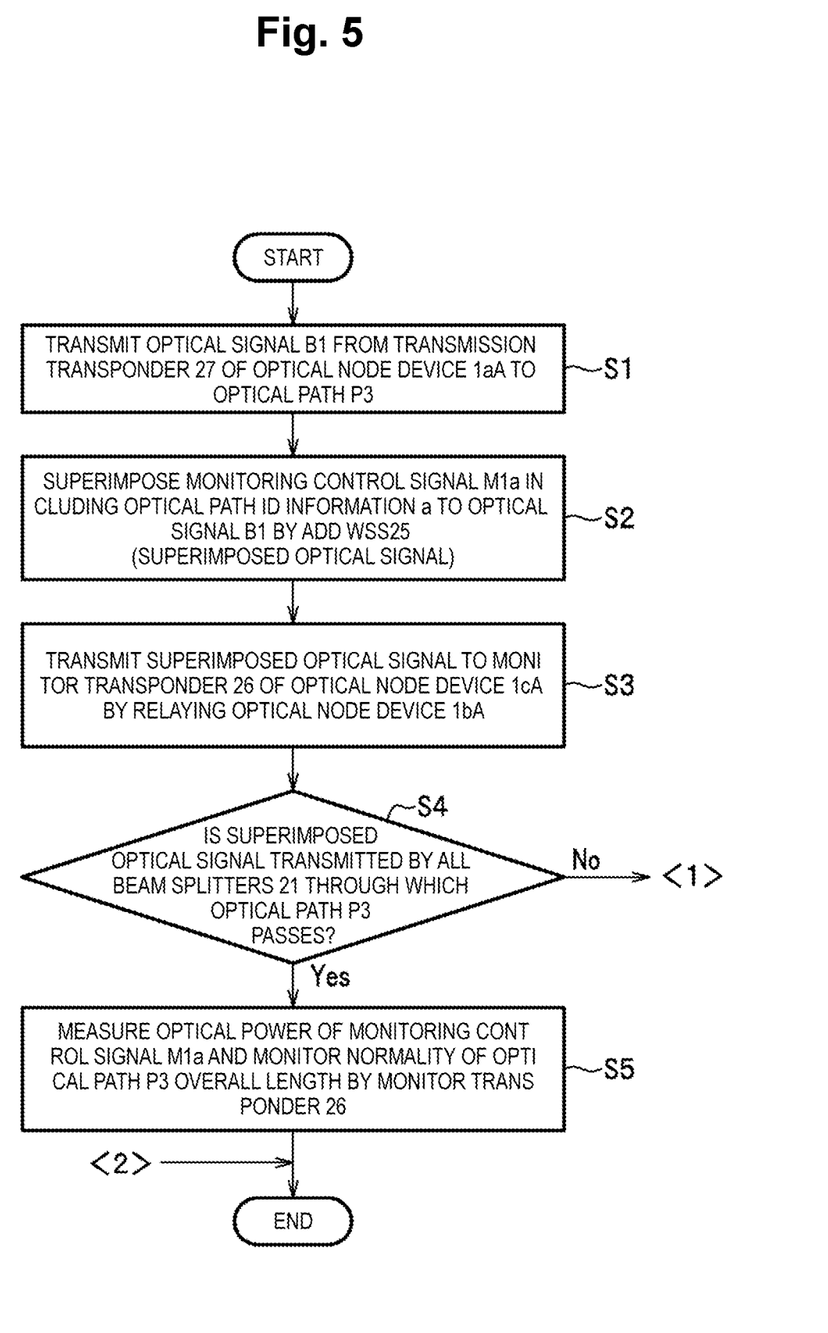
FIG. 5 is a first flowchart for explaining an optical path trace process by the optical node device of the present embodiment.

In step S1 illustrated in FIG. 5, the optical signal B1 transmitted from the transmission transponder 27 is output to the add WSS 25 via the optical path P3.

In step S2, it is assumed that the monitoring control signal M1a including the optical path ID information a is superimposed on the optical signal B1 by the add WSS 25. At the time of this superimposition, unique information of the add WSS 25 of the optical node device 1aA is also added.

In step S3, the optical signal B1 (referred to as a superimposed optical signal) on which the monitoring control signal M1a is superimposed is transmitted to the monitoring transponder 26 of the optical node device 1cA via the optical path P3 via the optical node device 1bA.

In step S4, it is determined whether the superimposed optical signal has been transmitted by all the beam splitters 21 through which the optical path p3 passes. This determination is made when the monitoring transponder 26 at the end point detects the monitoring control signal M1a from the superimposed optical signal.

As a result of this determination, if all the beam splitters 21 through which the optical path P3 passes transmit (Yes), the monitoring transponder 26 measures and monitors the optical power of the monitoring control signal M1a in step S5. The monitor monitors whether the optical power is equal to or higher than a predetermined level indicating normality of the optical path. By checking this display, the NW administrator can grasp the normality of the entire optical path P3 between the transmission transponder 27 at the start point and the monitoring transponder 26 at the end point that relays the optical node device 1bA.

Figure 6:
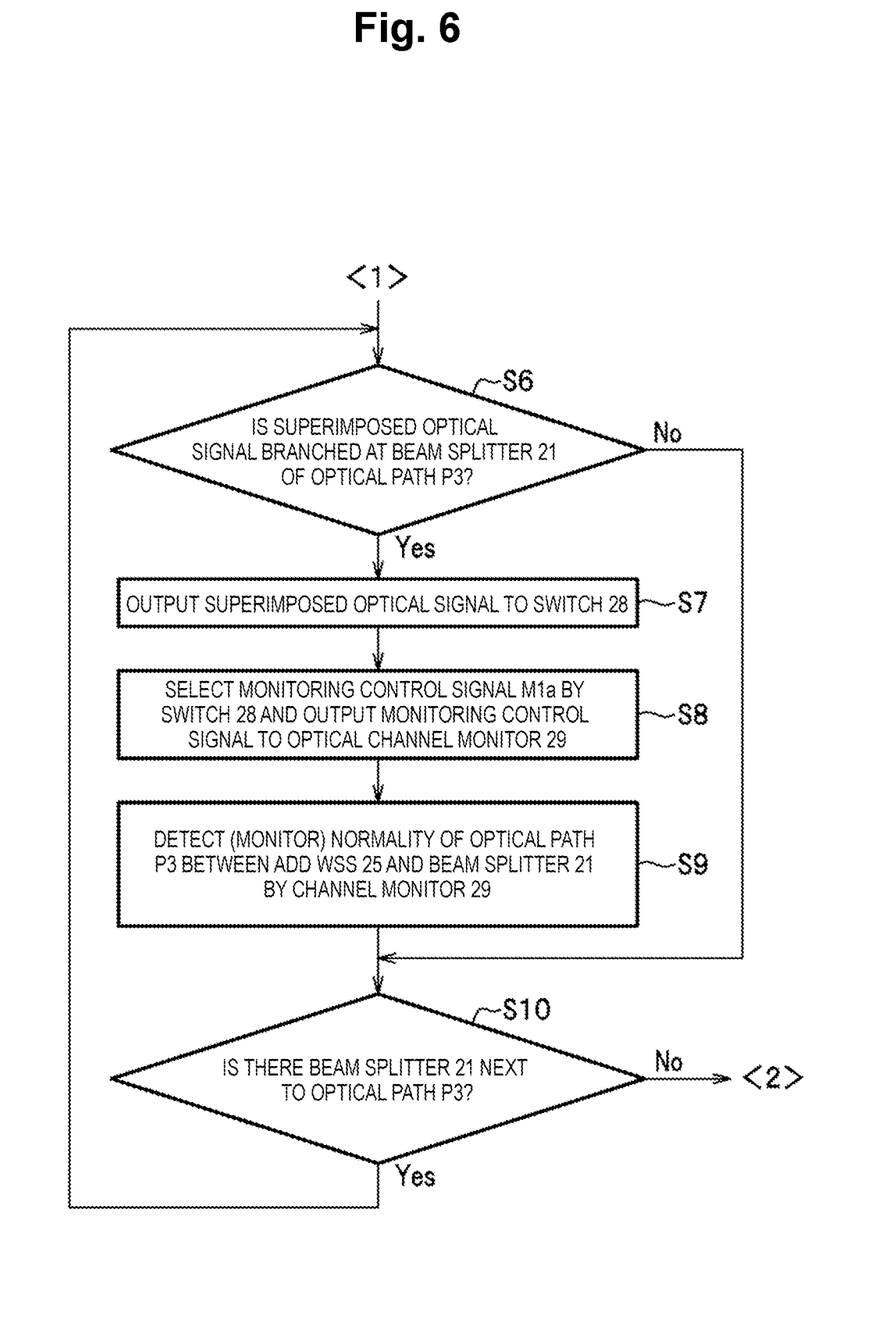
FIG. 6 is a second flowchart for explaining an optical path trace process by the optical node device of the present embodiment.

On the other hand, in a case where in step S4, it is determined that the superimposed optical signal is not transmitted through all the beam splitters 21 (No), it is determined in step S6 of FIG. 6 whether the superimposed optical signal is branched by reflection at the beam splitter 21d on the most starting point side of the optical path P3.

As a result of the determination, when it is determined as branched (Yes), in step S7, the branched superimposed optical signal is output to the switch 28 as indicated by a broken line arrow Y1a in FIG. 1.

In step S8, in the switch 28, the monitoring control signal M1a is selected and output to the optical channel monitor 29 as indicated by a dashed arrow Y1b.

In Step S9, the optical channel monitor 29 reads the temporal change of the optical power of the monitoring control signal M1a and demodulates the optical path ID information a. Further, the optical channel monitor 29 detects the optical path P3 between the add WSS 25 and the beam splitter 21d based on the optical path ID information a, and detects (monitors) normality of the detected optical path P3.

In step S10, it is determined whether there is the beam splitter 21 on the next subsequent stage side in the optical path P3. This determination is made when the optical channel monitor 29 detects the monitoring control signal M1a branched by the next beam splitter 21. If it can be detected, it is determined that there is the beam splitter, and if it cannot be detected, it is determined that there is no beam splitter. As a result of this determination, since there is the beam splitter 21a of the next optical node device 1bA, the process returns to Step S6. On the other hand, in a case where there is no beam splitter, the optical path trace process is terminated.

That is, in step S6, the optical channel monitor 29 determines whether the superimposed optical signal is branched by the beam splitter 21a of the next optical node device 1bA.

As a result of the determination, when it is determined as branched (Yes), in step S7, the branched superimposed optical signal is output to the switch 28 as indicated by a broken line arrow Y2a.

In step S8, in the switch 28, the monitoring control signal M1a is selected and output to the optical channel monitor 29 as indicated by a dashed arrow Y2b.

In Step S9, the optical channel monitor 29 reads the temporal change of the optical power of the monitoring control signal M1a and demodulates the optical path ID information a, and the add WSS 25, and the optical path ID information a of the beam splitter 21a. Further, the optical channel monitor 29 detects the optical path P3 between the add WSS 25 and the beam splitter 21a based on the optical path ID information a, and detects (monitors) normality of the detected optical path P3.

In step S10, the optical channel monitor 29 determines whether there is the beam splitter 21 on the next subsequent stage side in the optical path P3. As a result of this determination, since there is the beam splitter 21d of the next optical node device 1bA, the process returns to Step S6.

That is, in step S6, it is determined whether the superimposed optical signal is branched by the beam splitter 21d of the next optical node device 1bA.

As a result of the determination, when it is determined as branched (Yes), in step S7, the branched superimposed optical signal is output to the switch 28 as indicated by a broken line arrow Y2c.

In step S8, in the switch 28, the monitoring control signal M1a is selected and output to the optical channel monitor 29 as indicated by a dashed arrow Y2b.

In Step S9, the optical channel monitor 29 reads the temporal change of the optical power of the monitoring control signal M1a and demodulates the optical path ID information a, and the add WSS 25, and the optical path ID information a of the beam splitter 21d. Further, the optical channel monitor 29 detects the optical path P3 between the add WSS 25 and the beam splitter 21d based on the optical path ID information a, and detects (monitors) normality of the detected optical path P3.

In step S10, it is determined whether there is the beam splitter 21 on the next subsequent stage side in the optical path P3. As a result of this determination, since there is the beam splitter 21a of the next optical node device 1cA, the process returns to Step S6.

That is, in step S6, it is determined whether the superimposed optical signal is branched by the beam splitter 21a of the next optical node device 1cA.

As a result of the determination, when it is determined as branched (Yes), in step S7, the branched superimposed optical signal is output to the switch 28 as indicated by a broken line arrow Y3a.

In step S7, in the switch 28, the monitoring control signal M1a is selected and output to the optical channel monitor 29 as indicated by a dashed arrow Y3b.

In Step S8, the optical channel monitor 29 reads the temporal change of the optical power of the monitoring control signal M1a and demodulates the optical path ID information a, and the add WSS 25, and the optical path ID information of the beam splitter 21a. Further, the optical channel monitor 29 detects the optical path P3 between the add WSS 25 and the beam splitter 21a based on the optical path ID information a, and detects (monitors) normality of the detected optical path P3.

In step S10, it is determined whether there is the beam splitter 21 on the next subsequent stage side in the optical path P3. As a result of this determination, since there is the beam splitter 21b of the next optical node device 1cA, the process returns to Step S6.

That is, in step S6, it is determined whether the superimposed optical signal is branched by the beam splitter 21b of the next optical node device 1cA.

As a result of the determination, when it is determined as branched (Yes), in step S7, the branched superimposed optical signal is output to the switch 28 as indicated by a broken line arrow Y3c.

In step S8, in the switch 28, the monitoring control signal M1a is selected and output to the optical channel monitor 29 as indicated by a dashed arrow Y3b.

In Step S9, the optical channel monitor 29 reads the temporal change of the optical power of the monitoring control signal M1a and demodulates the optical path ID information a, and the add WSS 25, and the optical path ID information a of the beam splitter 21b. Further, the optical channel monitor 29 detects the optical path P3 between the add WSS 25 and the beam splitter 21b based on the optical path ID information a, and detects (monitors) normality of the detected optical path P3.

In step S10, it is determined whether there is the beam splitter 21 on the next subsequent stage side in the optical path P3. As a result of this determination, since there is no next beam splitter 21, the optical path trace process is terminated.

Effects of Embodiment (1a) An optical node device 1aA to 1cA includes a transmission transponder 27, WSSs 22 to 25, a beam splitter 21, and a monitoring transponder 26. The transmission transponder 27 transmits an optical signal B1 via an optical path P3 extended over an optical fiber 2. The WSSs 22 to 25 multiplex, on the transmitted optical signal B1, a monitoring control signal M1 for performing optical path tracing that is confirmation of conduction along the optical path P3.

The beam splitter 21 branches the optical signal B1 in which the monitoring control signal M1 is multiplexed. The monitoring transponder 26 measures and monitors the optical power of the monitoring control signal M1 multiplexed on the optical signal B1 branched by the beam splitter 21. Further, the monitoring transponder 26 is configured to monitor whether the monitored optical power is equal to or higher than a predetermined level indicating the normality of the optical path P3.

According to this configuration, the optical node device 1bA can determine the normality of the optical path P3 from the optical power of the monitoring control signal M1 multiplexed with the optical signal B1 transmitted from the other optical node device 1aA. Since the normality of the optical path P3 is determined by the dedicated monitoring control signal M1, it is possible to appropriately determine the abnormality of the optical path P3 set between the optical node devices 1aA and 1cA. In addition, also in the optical node device 1bA that relays the optical path P3 between the optical node devices 1aA and 1cA, the normality of the optical path P3 can be determined by the optical node device 1bA for relaying, so that the optical path tracing can be appropriately performed.

(2a) The WSSs 22 to 25 include an optical channel monitor 29 that performs multiplexing including unique optical path ID information when the monitoring control signal M1 is multiplexed into the optical signal B1 and monitors the optical path ID information obtained by reading and demodulating a temporal change of optical power of the monitoring control signal M1 multiplexed into the optical signal B1 branched by the beam splitter 21. The optical channel monitor 29 is configured to detect normality of the optical path P3 between the transmission transponder 27 and the beam splitter 21 that has branched the optical signal B1 based on the optical path ID information.

According to this configuration, it is possible to confirm the normality of the optical path P3 between the start point and the beam splitter 21 disposed in the middle between the transmission transponder 27 at the start point for transmitting the optical signal B1 and the monitoring transponder 26 at the end point for receiving the optical signal B1.

(3a) The WSSs 22 to 25 include an input collimator 61 to which the optical signal B1 is input, a diffraction grating 65 that receives the optical signal B1 through the input collimator 61, diffracts the optical signal at a different angle according to a wavelength of the optical signal B1, reflects the optical signal, and demultiplexes the optical signal, a spatial light modulator 68 that reflects the demultiplexed optical signal B1 and applies a voltage B1V of the monitoring control signal M1 to the optical signal B1 at the time of reflection to apply intensity modulation, and an output collimator 62a that outputs the optical signal B1 reflected by the spatial light modulator 68.

According to this configuration, the WSSs 22 to 25 can be configured by an optical system component obtained by combining the input and output collimators, the diffraction grating, and the spatial light modulator. Therefore, it is possible to reduce the size of the optical node devices 1aA to 1cA including the WSSs 22 to 25.

(4a) The OTN system 10A has a configuration in which the optical node devices 1aA to 1cA described in any one of (1a) to (3a) above are subordinately connected by the optical fiber 2 via the beam splitter 21.

According to this configuration, in the optical node devices 1aA to 1cA at both ends to which the optical path P3 is extended, the normality of the optical path P3 can be determined from the optical power of the monitoring control signal M1 multiplexed with the optical signal B1 transmitted through the optical path P3. This determination can appropriately determine the abnormality of the optical path P3 based on the dedicated monitoring control signal M1. In addition, also in the optical node devices 1aA to 1cA that relay the optical path P3 between the optical node devices 1aA and 1cA, the normality of the optical path P3 can be determined by the optical node devices 1aA to 1cA for relaying, so that the optical path tracing can be appropriately performed.

(5a) The OTN system 10A is configured to multiplex the monitoring control signal M1 with unique optical path ID information into the optical signal B1 to be transmitted on the optical path P3 in each of the WSSs 22 to 25 on the optical path P3 extended between the optical node devices 1aA to 1cA subordinately connected.

According to this configuration, in the arbitrary WSSs 22 to 25, the monitoring control signal M1 having the unique optical path ID information can be multiplexed into the optical signal B1. Therefore, it is possible to confirm the normality of the optical path P3 in an arbitrary section such as the optical path P3 between the WSSs 22 to 25 of the desired optical node devices 1aA to 1cA and the beam splitter 21 of the other optical node devices 1aA to 1cA, the optical path P3 between the transmission transponder 27 at the start point and the WSSs 22 to 25 of the desired optical node devices 1aA to 1cA, and the optical path P3 between the WSSs 22 to 25 of the desired optical node devices 1aA to 1cA and the monitoring transponder 26 at the end point.

In addition, a program executed by the computer according to the present embodiment will be described. The computer is assumed to be an optical node device {for example, an optical node device 1aA (FIG. 1)}.

This program causes the computer to function as: means for transmitting an optical signal B1 via an optical path P3 extended over the optical fiber, means for multiplexing, on the transmitted optical signal B1, a monitoring control signal M1 for performing optical path P3 tracing that is confirmation of conduction along the optical path P3, means for branching the optical signal B1 in which the monitoring control signal M1 is multiplexed, means for measuring and monitoring optical power of the monitoring control signal M1 multiplexed into the optical signal B1, and means for monitoring whether the monitored optical power is equal to or higher than a predetermined level indicating normality of the optical path P3.

According to this program, effects similar to the effects of the optical node devices 1aA to 1cA described above can be obtained.

<Effects>

(1) An optical node device including a transmission transponder that transmits an optical signal via an optical path extended over an optical fiber, a wavelength selective switch (WSS) that multiplexes, on the transmitted optical signal, a monitoring control signal for performing optical path tracing that is confirmation of conduction along the optical path, a branching unit that branches the optical signal in which the monitoring control signal is multiplexed, and a monitoring transponder that measures and monitors optical power of the monitoring control signal multiplexed into the optical signal branched by the branching unit, in which the monitoring transponder monitors whether the monitored optical power is equal to or higher than a predetermined level indicating normality of the optical path.

According to this configuration, the optical node device can determine the normality of the optical path from the optical power of the monitoring control signal multiplexed with the optical signal transmitted from the other optical node device. Since the normality of the optical path is determined by the dedicated monitoring control signal, it is possible to appropriately determine the abnormality of the optical path set between the optical node devices. In addition, also in the optical node device that relays the optical path between the optical node devices, the normality of the optical path can be determined by the optical node device for relaying, so that the optical path tracing can be appropriately performed.

(2) The optical node device described in above (1), in which the WSS includes an optical channel monitor that, when multiplexing the monitoring control signal with the optical signal, multiplexes the monitoring control signal including unique optical path identification (ID) information, and monitors the optical path ID information obtained by reading and demodulating a temporal change of the optical power of the monitoring control signal multiplexed on the optical signal branched by the branching unit, and the optical channel monitor monitors the normality of the optical path between the transmission transponder and the branching unit branching the optical signal based on the optical path ID information.

According to this configuration, it is possible to confirm the normality of the optical path between the start point and the branching unit disposed in the middle between the transmission transponder at the start point for transmitting the optical signal and the monitoring transponder at the end point for receiving the optical signal.

(3) The optical node device described in any one of above (1) to (3), in which the WSS includes an input collimator to which the optical signal is input, a diffraction grating that receives the optical signal through the input collimator, diffracts the optical signal at a different angle according to a wavelength of the optical signal, reflects the optical signal, and demultiplexes the optical signal, a spatial light modulator that reflects the demultiplexed optical signal and applies a voltage of the monitoring control signal to the optical signal at the time of reflection to apply intensity modulation, and an output collimator that outputs the optical signal reflected by the spatial light modulator.

According to this configuration, the WSSs can be configured by an optical system component obtained by combining the input and output collimators, the diffraction grating, and the spatial light modulator. Since the similar WSS of a multiple-output type with one input exists in a general-purpose type, the WSS of the present embodiment can be easily created by using the WSS.

(4) An optical transport network system, in which the optical node device described in any one of above (1) to (3) is subordinately connected by an optical fiber via the branching unit.

According to this configuration, in the optical node devices at both ends to which the optical path is extended, the normality of the optical path can be determined from the optical power of the monitoring control signal multiplexed with the optical signal transmitted through the optical path. This determination can appropriately determine the abnormality of the optical path based on the dedicated monitoring control signal. In addition, also in the optical node device that relays the optical path between the optical node devices, the normality of the optical path can be determined by the optical node device for relaying, so that the optical path tracing can be appropriately performed.

(5) The optical transport network system described in above (4), in which a monitoring control signal with unique optical path ID information is multiplexed into an optical signal to be transmitted on the optical path in each of the WSSs on the optical path extended between the subordinately connected optical node device.

According to this configuration, in the arbitrary WSSs, the monitoring control signal having the unique optical path ID information can be multiplexed into the optical signal. Therefore, it is possible to confirm the normality of the optical path in an arbitrary section such as the optical path between the WSS of the desired optical node device and the branching unit of another optical node device, the optical path between the transmission transponder at the start point and the WSS of the desired optical node device, and the optical path between the WSS of the desired optical node device and the monitoring transponder at the end point.

In addition, the specific configuration can be appropriately changed without departing from the gist of the present invention.

REFERENCE SIGNS LIST

1aA to 1cA Optical node device
10A OTN system
21a to 21d Beam splitter (branching unit)
22 Separation WSS
23 Multiplexing WSS
24 Drop WSS
25 Add WSS
26 Monitoring transponder
27 Transmission transponder
28 Switch
29 Optical channel monitor
P3 Optical path
61 Input fiber collimator
62a, 62b Output fiber collimator
65 Grating (diffraction grating)
67 Lens
68 Spatial light modulator
B1V Monitoring control voltage

The invention claimed is:

1. An optical node device comprising:
   a transmission transponder for transmitting an optical signal via an optical path extended over an optical fiber;
   a wavelength selective switch (WSS) for multiplexing, on the transmitted optical signal, a monitoring control signal for performing optical path tracing that is confirmation of conduction along the optical path;
   a branching unit for branching the optical signal in which the monitoring control signal is multiplexed; and
   a monitoring transponder for measuring and monitoring optical power of the monitoring control signal multiplexed into the optical signal branched by the branching unit, wherein
   the monitoring transponder for monitoring whether the monitored optical power is equal to or higher than a predetermined level indicating normality of the optical path.

2. The optical node device according to claim 1, wherein the WSS includes
   an optical channel monitor for, when multiplexing the monitoring control signal with the optical signal, multiplexing the monitoring control signal including unique optical path identification (ID) information, and monitoring the optical path ID information obtained by reading and demodulating a temporal change of the optical power of the monitoring control signal multiplexed on the optical signal branched by the branching unit, and
   wherein the optical channel monitor is used for monitoring the normality of the optical path between the transmission transponder and the branching unit branching the optical signal based on the optical path ID information.

3. The optical node device according to claim 1, wherein the WSS includes
   an input collimator to which the optical signal is input,
   a diffraction grating for receiving the optical signal through the input collimator, diffracting the optical signal at a different angle according to a wavelength of the optical signal, reflecting the optical signal, and demultiplexing the optical signal,
   a spatial light modulator for reflecting the demultiplexed optical signal and applying a voltage of the monitoring control signal to the optical signal at the time of reflection to apply intensity modulation, and
   an output collimator for outputting the optical signal reflected by the spatial light modulator.

4. An optical transport network system, comprising a plurality of optical node devices according to claim 1, wherein
   the plurality of optical node devices are connected by the optical fiber via the branching unit.

5. The optical transport network system according to claim 4, wherein
   the monitoring control signal has unique optical path ID information and is multiplexed into the optical signal to be transmitted on the optical path in each of WSSs on the optical path extended between the plurality of connected optical node devices.

6. An optical path tracing method by an optical node device, comprising:
   transmitting an optical signal via an optical path extended over an optical fiber,
   multiplexing, on the transmitted optical signal, a monitoring control signal for performing optical path tracing that is confirmation of conduction along the optical path,
   branching the optical signal in which the monitoring control signal is multiplexed,
   measuring and monitoring optical power of the monitoring control signal multiplexed into the optical signal, and
   monitoring whether the monitored optical power is equal to or higher than a predetermined level indicating normality of the optical path.

7. A non-transitory computer readable medium storing a program, wherein executing of the program causes a computer, using the optical node device of claim 1, to perform operations comprising:
   transmitting an optical signal via an optical path extended over an optical fiber,
   multiplexing, on the transmitted optical signal, a monitoring control signal for performing optical path tracing that is confirmation of conduction along the optical path,
   branching the optical signal in which the monitoring control signal is multiplexed,
   measuring and monitoring optical power of the monitoring control signal multiplexed into the optical signal, and
   monitoring whether the monitored optical power is equal to or higher than a predetermined level indicating normality of the optical path.

8. The optical node device according to claim 2, wherein the WSS includes
   an input collimator to which the optical signal is input,
   a diffraction grating for receiving the optical signal through the input collimator, diffracting the optical signal at a different angle according to a wavelength of the optical signal, reflecting the optical signal, and demultiplexing the optical signal,
   a spatial light modulator for reflecting the demultiplexed optical signal and applying a voltage of the monitoring control signal to the optical signal at the time of reflection to apply intensity modulation, and
   an output collimator for outputting the optical signal reflected by the spatial light modulator.

9. An optical transport network system, comprising a plurality of optical node devices according to claim 2, wherein the plurality of optical node devices are connected by the optical fiber via the branching unit.

10. An optical transport network system, comprising a plurality of optical node devices according to claim 3, wherein the plurality of optical node devices are connected by the optical fiber via the branching unit.

* * * * *